United States Patent [19]

Winter et al.

[11] 3,892,583

[45] July 1, 1975

[54] PRODUCTION OF SHAPED ARTICLES OF SILICON CARBIDE AND SILICON NITRIDE

[75] Inventors: Gerhard Winter; Wolfgang Verbeek; Manfred Mansmann, all of Krefeld, Germany

[73] Assignee: Bayer Aktiengesellschaft, Leverkusen, Germany

[22] Filed: Aug. 22, 1973

[21] Appl. No.: 390,450

[30] Foreign Application Priority Data
Sept. 5, 1972  Germany............................ 2243527

[52] U.S. Cl. ..................... 106/55; 106/43; 106/44
[51] Int. Cl. ..................... C04b 35/52; C04b 35/58
[58] Field of Search.......................... 106/43, 44, 55

[56] References Cited
UNITED STATES PATENTS

| | | | |
|---|---|---|---|
| 2,618,565 | 11/1952 | Nicholson............................ | 106/55 |
| 3,222,438 | 12/1965 | Parr et al.............................. | 106/55 |
| 3,269,802 | 8/1966 | Wainer et al......................... | 106/44 |
| 3,468,992 | 9/1969 | Lubatti et al......................... | 106/44 |

*Primary Examiner*—J. Poer
*Attorney, Agent, or Firm*—Burgess, Dinklage & Sprung

[57] ABSTRACT

A melt or solution of a silazane is formed into a shaped article by molding or melt or dry extrusion and is thereafter heated in an inert atmosphere to about 800° to 2,000°C to decompose the silazane into a homogeneous mixture of silicon carbide and silicon nitride. The silazane is produced by reacting ammonia with a halogenosilane and, if effected in solution, after removal of by-product ammonium chloride and optionally concentrating, the solution is directly employed for shaping. The solution may be rendered spinnable by addition of small amounts of high polymers and various other additives may also be employed. Fibers produced therefrom are of satisfactory mechanical properties and are suited for use as insulation and reinforcement in laminates.

8 Claims, No Drawings

PRODUCTION OF SHAPED ARTICLES OF SILICON CARBIDE AND SILICON NITRIDE

The present invention relates to a process for the manufacture of shaped articles from homogeneous mixtures of silicon carbide with silicon nitride, optionally mixed with silicon dioxide and/or carbon. As employed herein, shaped articles includes but is not limited to fibers, filaments, flakes, powders, films, coatings, foam articles and the like manufactured from these mixtures, and the subsequent products obtained therefrom such as mats, fabrics, blocks, pipes, crucibles, slabs, jackets, grinding wheels and the like. Such shaped articles, because of their chemical composition, are oxidation-resistant up to high temperatures. Their good physical properties, such as low density and excellent mechanical strength, make the materials, in the form of fibers, filaments and flakes, very suitable for reinforcing plastics, glasses, ceramic materials and metals. Corresponding coatings are suitable for lining parts of apparatus to be protected against corrosion at high temperatures, while foam articles of silicon carbide can be used very advantageously as a temperature-resistant and corrosion-resistant insulating material and filter material or catalyst support. Pipes, crucibles, blocks or the like made from these mixtures are suitable for use as high temperature constructional materials because of their good chemical resistance.

Continuous filaments of silicon carbide can be manufactured according to a known process by exposing a carbon filament, manufactured according to conventional processes, to a silicon tetrachloride gas atmosphere at 800° – 1,200°C (U.S. Pat. No. 3,433,725). According to a further known process, continuous filaments of silicon carbide are obtained by coating a thin tungsten filament with silicon carbide which is formed on the tungsten surface, which is kept at 1,200° to 1,300°C, by pyrolysis of methyldichlorosilane [F. Galasso et al., Appl. Phys. Lett. 9 (1966) 37]. The disadvantage of these processes is that relatively thick silicon carbide fibers result, which are difficult to handle, and their high manufacturing cost prevents broad application.

Shaped articles such as, for example, pipes, crucibles and blocks can be manufactured according to known processes by sintering pulverulent silicon carbide, with the addition of silicon powder, in appropriate molds, mostly with the use of high pressures and temperatures, in the presence of nitrogen. Here, the silicon nitride formed acts as a sintering aid.

It is furthermore known to produce silicon carbide coatings on suitable shaped articles by pyrolysis of a mixture of silicon tetrachloride, toluene and hydrogen [K. Moers, Z. anorg. allg. Chem. 198 (1931) 243].

Foam articles of silicon carbide can be manufactured according to the process of U.S. Pat. No. 3,100,688, by reacting a mixture of finely divided silicon dust and carbon dust with dilute hydrofluoric acid and heating the foam article thereby formed, after drying, to a temperature of between 1,400° and 2,200°C under an inert gas.

The present invention relates to a process for the production of a shaped article comprising a homogeneous mixture of silicon carbide and silicon nitride comprising forming a mass comprising a silazane into a shaped article, and heating said shaped article to a temperature between about 800° and 2,000°C in an inert atmosphere, whereby the silazane decomposes. The resulting shaped article comprises a homogeneous mixture of silicon carbide with silicon nitride and optionally silicon dioxide and/or carbon. The shaped articles which are obtained according to the present process have the following composition:

Si: about 30 to 70 percent by weight
C: about 5 to 60 percent by weight
N: about 5 to 35 percent by weight
O: about 0 to 12 percent by weight Whereas in the hitherto known processes for the manufacture of shaped articles it was necessary, in the case of fibers, to convert a substrate filament of carbon or tungsten into a filament consisting only or partially of silicon carbide by an expensive vapor deposition process, a filament which is very suitable for reinforcement purposes can be manufactured in a simple manner by the process according to the invention, by spinning the silazane compounds and subsequent heat treatment. In the manufacture of other shaped articles such as films, coatings and foam articles, difficulties do not arise, since the silazane compounds, in the fused or dissolved state, are outstandingly capable of conversion into shapes of the most diverse type. It is furthermore of advantage not to manufacture articles such as grinding wheels, crucibles, pipes and blocks by means of conventional reaction sintering processes at very high temperatures but instead to press mixtures of auxiliary materials, for example silicon carbide of different particle sizes, with silazane compounds into the desired shape at low temperatures and subsequently to calcine these articles.

Silazane compounds are known in large numbers and are almost exclusively manufactured by the reaction of a halogenosilane with a compound carrying one or more $NH_2$ or NH groups, with elimination of hydrogen halide. Thereby, silazane compounds are in most cases formed, which are liquids or fusible compounds at room temperature [compare, for example, E. A. V. Ebsworth, Volatile Silicon Compounds, Pergamon Press, Oxford, 1963; C. Eaborn, Organosilicon Compounds, Butterworths, London 1960; page 339; U. Wannagat, Advances in Inorg. Chem. and Radiochem. VI, 225 (1964); B. J. Aylett, Silicon-Nitrogen Compounds].

However, the possibility also exists of obtaining silazane compounds which, in the reaction of the halogenosilane and the compound carrying one or more $NH_2$ or NH groups, produce a crosslinked, high molecular resinous product already at a temperature of 20° – 200°C. These are oily and resinous silazane compounds the manufacture of which by reaction of various halogenosilanes with ammonia at room temperature has been known for a considerable time and is described in U.S. Pat. Nos. 2,579,416 and 2,579,417. These silazane compounds are starting substances for the process according to the invention for the manufacture of shaped articles from homogeneous mixtures of silicon carbide and silicon nitride.

The halogenosilane to be used for the formation of suitable resinous silazanes can have the general formula $$R_n SiX_{4-n},$$

wherein
R is hydrogen, alkyl, alkenyl and/or aryl,
X is F, Cl, Br or I, and
n is 0, 1, 2 or 3.

Preferably, R represents identical or different $C_1$–$C_6$ radicals, especially a methyl, ethyl, propyl, vinyl or phenyl group, or hydrogen. Silazane compounds produced starting from halogenosilanes with $n = 0$, 1, 2 or 3 and ammonia, display greatly differing properties. While silazane compounds which are formed by the reaction of halogenosilanes with $n = 0$ and ammonia are mostly insoluble, highly crosslinked products which on heating undergo further condensation and yield exclusively silicon nitride, the reaction of halogenosilanes with $n = 3$ and ammonia mostly yields non-crosslinked, easily soluble liquids or solids with defined boiling points or melting points. The reaction of halogenosilanes with $n = 2$ and ammonia mostly leads to oily silazane compounds of ring structure or chain structure, which, depending on the nature of the organic radical, change into more highly crosslinked, resinous compounds already at temperatures of between 20° and 200°C. Only the reaction of halogenosilanes with $n = 1$ and ammonia yields silazane compounds which are already crosslinked at room temperature, so that these compounds, while mostly still soluble, are already products which are difficult to fuse or are infusible.

In addition to the reaction of pure halogenosilanes with ammonia there exists of course the possibility of subjecting mixtures of different halogenosilanes to the ammonolysis reaction, for example the following mixtures, with the particular preferentially used molar ratios being indicated in brackets:

$SiX_4/R_3SiX$ (20–70 mole %/80–30 mole %),
$SiX_4/R_2SiX_2$ (0–50 mole %/100–50 mole %),
$SiX_4/R\ SiX_3$ (0–30 mole %/100–70 mole %),
$RSiX_3/R_2SiX_2$ (0–100 mole %/100–0 mole %),
$RSiX_3/R_3SiX$ (50–100 mole %/50–0 mole %).

However, it is also possible to subject mixtures of more than two different halogenosilanes to the ammonolysis reaction. Preferably, halogenosilanes of the type of $R_2SiX_2$ and $RSiX_3$, as well as their mixtures, are used in the present invention.

Compounds of the type of $SiX_4$ and $R_3SiX$ are used in mixtures with compounds of the type of $R_2SiX_2$ and/or $RSiX_3$ especially to achieve certain degrees of crosslinking of the resulting silazane compounds. In this function as strong or weak "crosslinking agents" they are preferably used in amounts of about 1 to 80 mole %, and especially about 20 – 70 mole %, relative to the total halogenosilane mixture. In this way, more or less strongly crosslinked silazane compounds appropriate to the various possible uses can be obtained. The pattern of properties and the chemical composition of the shaped articles obtained by heating the silazane shaped articles under an inert gas can also be varied in the desired manner by varying the halogenosilanes or their mixtures. Thus, in the reaction of methyltrichlorosilane with ammonia, with heating of the resulting silazane compound under an inert gas, a homogeneous mixture of approximately 40 – 60 % by weight of silicon carbide and 40 – 60 % by weight of silicon nitride is formed, while on replacing the methyltrichlorosilane by phenyltrichlorosilane a homogeneous mixture of approximately 30 – 40 percent by weight of silicon carbide, 30 – 40 percent by weight of silicon nitride and 30 – 40 percent by weight of carbon is produced. The shaped articles formed are amorphous to X rays or have a crystallite size of, preferably, <2,000 A. Preferably, dihalogenoorganosilanes and trihalogenoorganosilanes which have a silicon-carbon atomic ratio of about 1:1 to 1:12 are used, such as, for example, methyltrichlorosilane, dimethyldichlorosilane, methyldichlorosilane, ethyltrichlorosilane, diethyldichlorosilane, vinyltrichlorosilane, phenyltrichlorosilane, diphenyldichlorosilane, phenyldichlorosilane and diphenylchlorosilane. The reaction of halogenosilane or mixtures of different halogenosilanes with ammonia is preferably carried out in solution. Suitable solvents are, in particular, low-boiling chlorinated hydrocarbons, such as methylene chloride, chloroform or carbon tetrachloride, the reaction preferably being carried out at a temperature of between −20°C and the boiling point of the solvent. The by-product hydrogen halide formed during the reaction is precipitated as ammonium halide and can be removed, for example, by filtration. The clear silazane solutions are concentrated up to the concentration required for the manufacture of the shaped article, preferably under gentle conditions in vacuo, in order to avoid premature condensation of the silazane compound with elimination of ammonia.

The silazane compounds are very readily soluble in conventional solvents such as chlorinated hydrocarbons, aromatics and higher alkanes but can, in a dilute or concentrated form, only be converted into fibers with difficulty since, because of their partly three-dimensional crosslinking, the silazane compounds do not display any filament-forming properties. The spinnability of the silazane solution—preferably chlorinated hydrocarbons are used as solvents—can be brought about, according to the invention, by adding to the solution linear polymeric high molecular auxiliaries with degrees of polymerization of above about 2,000, in a concentration of about 0.01 to 2 percent by weight. As linear polymeric substances it is possible to use vinyl polymers, vinyl copolymers, diolefin polymers, polyethers, polythioethers, polyesters, polyamides and polypeptides. Polyethylene oxide, polyisobutylene, polymethyl methacrylate, polyisoprene and polystyrene have proved particularly suitable. The silazane compound can be present in the spinning solution in a concentration of about 10 to 90 percent by weight, preferably about 20 to 40 percent by weight. In detail, the concentration depends firstly on the degree of crosslinking of the silazane compound and secondly on the nature of the organic groups contained in the silazane compound. For the manufacture of shaped articles such as films, foam articles, crucibles, blocks and the like, the use of the linear polymeric, high molecular auxiliaries is not necessary but they can, without detriment, be added to the mixture.

The present process is described more fully with reference to the manufacture of fibers.

A conventional dry spinning process can be used for the spinning of the silazane solutions. For this, the spinning solution is forced from a spinneret, which preferably has orificer of about 50 μm in diameter, into a heated spinning column, and the resulting continuous filaments are wound up while being stretched. When the filaments formed pass through the spinning column, the solvent is expelled and condensation, with elimination of ammonia, results in a substantially infusible silazane fiber. The silazane solutions can furthermore be spun by a jet-blowing process or a centrifugal spinning process to give staple fibers. In this way, glossy fibers of light grey color, having a cross-section of approximately 10 – 20 μm, can be spun.

Since the fiber-forming silazane compound already crosslinks during the spinning process, with elimination of ammonia, infusible fibers in most cases result, which can immediately be subjected to pyrolysis under an inert gas. However, if appropriate, the fibers can also be subjected to a heat treatment in the range of about 20° to 400°C, under air or inert gas, before the pyrolysis. The silazane fibers thus obtained are insensitive to oxidation up to a temperature of about 400° – 500°C, infusible and resistant to a large number of organic and inorganic solvents and can advantageously be used for heat-resistant filter fabrics or textile articles of low inflammability. During the subsequent heat treatment, all remaining volatile constituents are eliminated. For this purpose, the fibers are heated, if appropriate under tension, to a temperature of about 800° to 2,000°C in a tubular furnace. The rate of heating can be varied within wide limits and is, for example, 1°C/minute to 100°C/minute. The weight loss is approximately 10 – 30 %. When heated up to a temperature of about 1,400°C under an inert gas such as nitrogen, ammonia, argon or hydrogen, the black, glossy fibers consist of homogeneous mixtures of X-ray-amorphous silicon carbide and silicon nitride and possibly silicon dioxide and/or carbon. At higher temperatures, $\beta$-SiC and $\beta$-$Si_3N_4$ are formed. The fibers subjected to the heat treatment are completely oxidation-resistant up to a temperature of about 1,200°C and possess good mechanical strength. The tenacity of the fibers heat-treated at up to about 1,200°C under an inert gas, as measured in a commercially available tensometer (Tecam Tensile Testing Machine, of Messrs. Techne) is between about 90 and 130 $kp/mm^2$, and the modulus of elasticity is about 8,000 to 10,000 $kg/mm^2$. The modulus of elasticity can be increased further if the fibers are briefly brought to temperatures of up to about 2,000°C under argon. Because of their good mechanical properties and oxidation resistance even at high temperatures, the fibers are very suitable for use for the reinforcement of plastics, and especially of glasses, ceramics and metals. Furthermore, the fibers are outstandingly suitable for high temperature insulation and for use as a filter material for hot, corrosive gases and melts.

Films and flakes of homogeneous mixtures of silicon carbide and silicon nitride and optionally silicon dioxide and/or carbon, which are pore-free and are flexible in this form, can be manufactured by rolling or spreading a concentrated silazane solution on a smooth substrate containing a release agent, and subsequent heat-treatment of the silazane films under an inert gas. Foam articles are obtained when a concentrated silazane solution, optionally with the addition of a conventional blowing agent such as, for example, ammonium carbonate or azo-bis-isobutyric acid nitrile, is foamed by heating in an appropriate mold and is subsequently heated to about 800° – 2,000°C under an inert gas. Frequently, the solvent present also suffices as the propellant. Foam articles thus obtained possess an extremely low density and are very suitable for use as insulating media and filter media at very high temperatures. To manufacture coatings of homogeneous mixtures of silicon carbide and silicon nitride and optionally silicon dioxide and/or carbon, the surface to be protected with a coating can be spread or impregnated with a silazane solution. After the heat treatment, firmly adhering gas-tight protective layers of the desired thickness result, which are insensitive to corrosion at high temperatures.

The process according to the invention further encompasses the manufacture of shaped articles of silicon carbide and/or silicon nitride, wherein these substances can have been manufactured according to any desired process. Because of the low sinterability of silicon carbide, the manufacture of dense shaped articles from these materials is difficult. Silazane compounds, mixed with silicon carbide and/or silicon nitride of various particle sizes, can be converted into articles of any desired shape such as slabs, pipes, blocks, crucibles, rods and the like. For this purpose, the silazane compounds can be employed in the pure form or in the form of a solution. Thus, for example, mixtures of silicon carbide and/or silicon nitride or mixtures of other heat-resistant and/or corrosion-resistant substances such as, for example, inorganic oxides, silicates, nitrides, borides and carbides, metals, carbon and the like with the silazane compound can be pressed into shaped articles at a temperature at which crosslinking, and therefore curing, takes places with elimination of ammonia. The ratios of the amounts of silicon carbide and/or silicon nitride and/or other inorganic heat-resistant substances on the one hand and silazane compound on the other can be varied within wide limits. It is possible to add the inorganic heat-resistant substance in proportions of, for example, 5 to 95 percent by weight relative to the total mixture. Preferably, the proportion is between about 20 to 60 percent by weight. The composition ranges for Si, C, N and O set forth hereinabove of course refer to the matrix independent of the inorganic additives.

In order to obtain a homogeneous, bubble-free shaped article, it is advisable to apply vacuum to the press mold. Shaped articles manufactured in this way are subsequently heated under inert gas to a temperature of between about 800° and 2,000°C. Hard, dimensionally stable, oxidation-resistant shaped articles of low porosity such as, for example, pipes, grinding wheels, crucibles, blocks and the like, which can be used at up to high temperatures, are obtained.

Silazane compounds can also be used advantageously for embedding fibrous structures. Thus, for example, it is possible to manufacture laminates wherein the cross-linked silazane compound can serve as the matrix and a conventional glass fiber, a carbon fiber or a ceramic fiber can, for example, serve as the fiber reinforcement. Laminates manufactured in this way can be heated in air, without loss of their mechanical properties, up to a temperature of about 400° – 600°C. If the laminates are subjected to a suitable pyrolysis under inert gas in the range of 800° to 2,000°C, shaped articles of high mechanical strength which are oxidation-resistant and can be exposed to extreme high temperatures are obtained.

The silazane compound is furthermore outstandingly suitable for sealing porous articles of refractory materials such as, for example, tanks, crucibles, pipes or the like. For this, the article is impregnated with the silazane solution, this being done preferably in vacuo, and is subsequently fired to about 800° – 1,400°C under an inert gas. The process according to the invention is explained in more detail in the following examples.

EXAMPLE 1

35 g of ammonia are passed into a solution of 50 g of methyltrichlorosilane and 1 l of methylene chloride at 40°C, while stirring. The reaction mixture is subsequently freed of the resulting ammonium chloride by filtration. The silazane solution is concentrated to 93 g and 29 g of a solution of 2 g of polyethylene oxide (degree of polymerization: 100,000), 8 g of carbon tetrachloride and 90 g of methylene chloride are added. The mixture is homogenized for 1 hour while stirring slowly. The spinning solution contains 13.1 percent of silazane and 0.47 percent of polyethylene oxide. The spinning solution is spun at a spinning pressure of 0.01 atmosphere gauge, and a spinning column temperature of 30°C (column head) and 170°C (middle of column) through spinnerets of cross-section 400 μm, using a draw-off speed of 210 m/minute. The fibers are heated to 1,200°C over the course of 3 hours, under nitrogen. The weight loss is 8.8 percent. Black, glossy, completely oxidation-resistant, X-ray-amorphous fibers result, which possess a tenacity of 60 – 115 kp/mm$^2$ and a modulus of elasticity of 9,000 to 10,000 kp/mm$^2$. The fibers consist of approximately 50 percent by weight of silicon carbide and 50 percent by weight of silicon nitride.

EXAMPLE 2

A solution of 52 g of phenyltrichlorosilane and 1,500 g of methylene chloride is reacted with 30 g of ammonia at 40°C, while stirring. After filtration of the reaction mixture, the silazane solution is concentrated to 137 g in vacuo and homogenized with 100 g of a 2 percent strength solution of polystyrene (molecular weight 1.3 × 10$^7$) in methylene chloride, while stirring. The spinning solution contains 12.2 percent of silazane and 0.84 percent of polystyrene. The spinning solution is spun at a spinning pressure of 0.1 atmosphere gauge and a spinning column temperature of 25°C (column head) and 170°C (middle of column) through spinneret orificer of 400 μm in diameter, using a draw-off speed of 170 m/minute. The fibers, of 15 μm diameter, are heated to 1,200°C over the course of 3 hours under nitrogen. The weight loss is 15.8 percent. The black, X-ray-amorphous fibers consist of approximately 35 percent of silicon carbide, 35 percent of silicon nitride and approximately 30 percent of carbon.

EXAMPLE 3

To manufacture a film of a homogeneous mixture of silicon carbide and silicon nitride, a solution of 13.1 percent by weight of silazane and 0.47 percent by weight of polyethylene oxide in methylene chloride, manufactured analogously to Example 1, is spread, by means of a film-spreader, on a smooth Teflon base, and warmed at 110°C for one-half hour. The silazane film is pulled off and heated to 1,200°C over the course of 3 hours, under nitrogen. A black, glossy, oxidation-resistant film of 19 μm thickness, which is flexible and gas-impermeable, results.

EXAMPLE 4

A methylene chloride solution containing 26 percent by weight of silazane (manufactured by reaction of methyltrichlorosilane with ammonia analogously to Example 1) and 0.8 percent by weight of polyethylene oxide is warmed rapidly to 250°C in a porcelain crucible. The solvent which evaporates at the same time foams the silazane resin to approximately 10 times its original volume. Thereafter, the silazane foam article is heated to 1,200°C under nitrogen over the course of 3 hours. The resulting foam article is insensitive to oxidation and is an insulating material which can be used at temperatures of up to 1,400°C.

EXAMPLE 5

A mixture of 49.8 g of methyltrichlorosilane and 43 g of dimethyldichlorosilane in 2 l of methylene chloride is reacted with 50 g of ammonia at room temperature, while stirring. After removing the ammonium chloride, 60 g of commercial silicon carbide powder of particle size 0.1 cm are added and the mixture is freed of methylene chloride in vacuo. Thereafter, the oily mixture is warmed for 2 hours to a temperature of 130°C, whereupon condensation to a tough resin takes place, with elimination of ammonia. The plastic mixture is introduced into a mold which can be heated and is pressed for 2 hours at 300°C and 2.5 atmospheres gauge. The resulting shaped article is heated to 800°C over the course of 5 hours, under nitrogen. A hard, dimensionally stable, oxidation-resistant shaped article with good mechanical properties results.

EXAMPLE 6

2 g of aluminum oxide fibers manufactured according to the process of German Offenlegungsschrift (German Published Specification) No. 2,054,573 are oriented into a 6 cm web and introduced into a glass tube of internal diameter 5.4 mm. The fibers are impregnated by vacuum infiltration with a silazane compound such as is formed in the reaction of methyltrichlorosilane and dimethyldichlorosilane with ammonia, analogously to Example 5. Over the course of 2 hours, the tube, which is closed on one side and contains the wetted fibers, is heated to 300°C in vacuo and is left for 2 hours. After removal of the glass tube, a mechanically firm laminate which can be employed at up to a temperature of 510°C is obtained. This laminate is heated to a temperature of 1,200°C under nitrogen over the course of 5 hours. A hard, firm laminate which is completely oxidation-resistant at 1,200°C and of which the matrix consists of a mixture of silicon carbide and silicon nitride is obtained.

It will be appreciated that the instant specification and examples are set forth by way of illustration and not limitation, and that various modifications and changes may be made without departing from the spirit and scope of the present invention.

What is claimed is:

1. A process for the production of a shaped article comprising a homogeneous mixture of silicon carbide and silicon nitride comprising producing a silazane by reacting ammonia with at least one halogenosilane at a temperature of up to about 200°C, forming said silazane into a shaped article, and heating said shaped article to a temperature between about 800° and 2,000°C in an inert atmosphere, whereby said silazane decomposes into silicon carbide and silicon nitride.

2. The process of claim 1, wherein the reaction is effected in a solvent, by-product ammonium chloride is removed from said solvent and the solution comprises the silazane which is shaped.

3. The process of claim 2, wherein the halogenosilane is at least one compound of the formula $R_nSiX_{4-n}$ wherein R is hydrogen, alkyl, alkenyl or aryl, X is fluorine, chlorine or bromine, and n is 0, 1, 2 or 3.

4. The process of claim 3, wherein R is methyl, ethyl, propyl, vinyl or phenyl, and X is chlorine.

5. The process of claim 1, wherein the shaping of the silazane mass comprises melt spinning or dry spinning the silazane mass to produce fibers.

6. The process of claim 5, wherein the silazane mass comprises a solution which is dry spun into fibers, said solution having dissolved therein about 0.01 to 2 percent by weight of an organic polymer of a degree of polymerization above about 2,000.

7. The process of claim 6, wherein the organic polymer is at least one of polyethylene oxide, polystyrene, polyisobutylene, polymethyl methacrylate and polyisoprene.

8. The process of claim 1, wherein the silazane mass contains at least one heat-resistant additive selected from the group consisting of a carbide, a nitride, a boride, an oxide, a metal and carbon, the additive being present in an amount ranging from about 5 to 60 percent based on the weight of the entire mass.

* * * * *